(12) United States Patent
Misra et al.

(10) Patent No.: US 12,125,352 B2
(45) Date of Patent: Oct. 22, 2024

(54) SYSTEM, METHOD, AND COMPUTER PROGRAM PRODUCT FOR REAL-TIME AUTOMATED TELLER MACHINE FRAUD DETECTION AND PREVENTION

(71) Applicant: Visa International Service Association, San Francisco, CA (US)

(72) Inventors: Navendu Misra, Austin, TX (US); Rishi Arun Singh, San Mateo, CA (US); Ashton Mendes, Austin, TX (US); Durga S. Kala, Cupertino, CA (US); Dhruba Guha, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 122 days.

(21) Appl. No.: 17/634,258

(22) PCT Filed: Aug. 13, 2019

(86) PCT No.: PCT/US2019/046333
§ 371 (c)(1),
(2) Date: Feb. 10, 2022

(87) PCT Pub. No.: WO2021/029878
PCT Pub. Date: Feb. 18, 2021

(65) Prior Publication Data
US 2022/0319283 A1    Oct. 6, 2022

(51) Int. Cl.
*G06Q 20/40* (2012.01)
*G06Q 20/10* (2012.01)
*G07F 19/00* (2006.01)

(52) U.S. Cl.
CPC ....... *G07F 19/209* (2013.01); *G06Q 20/1085* (2013.01); *G06Q 20/4016* (2013.01); *G07F 19/207* (2013.01)

(58) Field of Classification Search
None
See application file for complete search history.

(56) References Cited

U.S. PATENT DOCUMENTS

| | | |
|---|---|---|
| 7,866,544 B1 | 1/2011 | Block et al. |
| 7,992,777 B1* | 8/2011 | Block ................ G07F 19/2055 235/379 |
| 8,447,674 B2 | 5/2013 | Choudhuri et al. |

(Continued)

*Primary Examiner* — William J Jacob
(74) *Attorney, Agent, or Firm* — The Webb Law Firm

(57) ABSTRACT

Described are a system, method, and computer program product for real-time automated teller machine (ATM) fraud detection and prevention. The method includes receiving transaction data of a plurality of transactions in real-time during processing at a transaction service provider system. The method further includes storing the transaction data in a distributed cache and receiving a transaction request for a user transaction at an ATM using a payment device. The method further includes modifying a profile of ATM activity stored in the distributed cache and comparing at least one metric of the profile to at least one predetermined ATM activity threshold. The method further includes activating a fraud prevention operation before the user transaction is completed at the ATM, including declining the user transaction, disabling a transaction account, communicating an alert to an issuer, or any combination thereof.

17 Claims, 7 Drawing Sheets

(56) References Cited

U.S. PATENT DOCUMENTS

| | | | |
|---|---|---|---|
| 8,606,712 B2* | 12/2013 | Choudhuri | G06Q 30/018 |
| | | | 705/30 |
| 9,652,772 B1* | 5/2017 | Eyges | G06Q 20/4016 |
| 2010/0228580 A1 | 9/2010 | Zoldi et al. | |
| 2011/0016052 A1 | 1/2011 | Scragg | |
| 2011/0238564 A1 | 9/2011 | Lim et al. | |
| 2012/0203698 A1 | 8/2012 | Duncan et al. | |
| 2012/0239570 A1 | 9/2012 | Wolfs et al. | |
| 2013/0024300 A1 | 1/2013 | Choudhuri et al. | |
| 2013/0024339 A1* | 1/2013 | Choudhuri | G06Q 50/265 |
| | | | 705/35 |
| 2013/0024373 A1* | 1/2013 | Choudhuri | G06Q 30/018 |
| | | | 705/42 |
| 2013/0024376 A1 | 1/2013 | Choudhuri et al. | |
| 2016/0055427 A1* | 2/2016 | Adjaoute | G06Q 30/0201 |
| | | | 706/12 |
| 2017/0169432 A1* | 6/2017 | Arvapally | G06Q 20/4016 |
| 2019/0108734 A1* | 4/2019 | Cook | H04N 7/188 |
| 2019/0188721 A1* | 6/2019 | Wiese | G07F 19/206 |
| 2020/0211021 A1* | 7/2020 | Allbright | G06Q 20/4016 |

* cited by examiner

SYSTEM, METHOD, AND COMPUTER PROGRAM PRODUCT FOR REAL-TIME AUTOMATED TELLER MACHINE FRAUD DETECTION AND PREVENTION

CROSS-REFERENCE TO RELATED APPLICATION

This application is the United States national phase of International Application No. PCT/US2019/046333 filed Aug. 13, 2019, the entire disclosure of which is hereby incorporated by reference in its entirety.

BACKGROUND

1. Technical Field

Disclosed embodiments or aspects relate generally to fraud detection and prevention, and, in non-limiting embodiments or aspects, to a system, method, and computer program product for detecting fraud in automated teller machine (ATM) transactions in real-time, using a distributed cache, and activating fraud prevention systems in response thereto.

2. Technical Considerations

Engaging in fraudulent ATM transactions, particularly withdrawals, may be referred to as "cash out fraud." Cash out fraud has created millions of dollars of loss, borne by both payment device users and financial institutions. Fraudulent transactions using ATMs are difficult to detect, and even when instances of fraud are detected, ATM transactions may be completed before traditional security systems trigger safety measures. Further complicating is that payment devices (e.g., debit cards) may be duplicated, such that multiple fraudulent actors may attempt fraudulent transactions at more than one ATM at once, or substantially close in time, in an attempt to get as much use from a compromised payment device before security measures engage. And while bank-wide data breaches may be common bases for initiating preemptive fraud prevention systems, such cases do not account for individual instances of fraud on specific payment devices, as they occur.

Moreover, fixed fraud prevention rules, particularly those applied rigidly across all users, do not fully account for individual payment device transaction behavior, regional transaction behavior, or trends and changes in transaction behavior. Fixed fraud prevention rules often result in false positives or false negatives, leading to frustrated users or undetected fraudulent transactions.

There is a need in the art for a technical solution to detect fraudulent ATM transactions during the processing of ATM transactions, particularly before cash withdrawals can occur. There is a need for such a technical solution to employ a computer network configured for fast data aggregation, recall, and analysis. There is a further need in the art for a technical solution to employ dynamic fraud prevention thresholds to allow for more accurate fraud detection.

SUMMARY

Accordingly, and generally, provided is an improved system, method, and computer program product for a computer-implemented method for real-time automated teller machine (ATM) fraud detection and prevention. Preferably, provided is a system, method, and computer program product for receiving transaction data of a plurality of transactions in real-time during transaction processing at a transaction service provider system. Preferably, provided is a system, method, and computer program product for storing the transaction data in a distributed cache for aggregation and recall of the transaction data. Preferably, provided is a system, method, and computer program product for receiving a transaction request at an ATM, modifying a profile of ATM activity, and comparing at least one metric of the profile to at least one predetermined ATM activity threshold. Preferably, provided is a system, method, and computer program product for activating a fraud prevention operation before a user transaction is completed at the ATM.

According to non-limiting embodiments or aspects, provided is a computer-implemented method for real-time ATM fraud detection and prevention. The method includes receiving, with at least one processor, transaction data of a plurality of transactions completed by at least one ATM, the transaction data received in real-time during transaction processing at a transaction service provider system. The method includes storing, with at least one processor, the transaction data in a distributed cache for aggregation and recall of the transaction data. The method includes receiving, with at least one processor, a transaction request for a user transaction at an ATM using a payment device, the transaction request including a payment device identifier. The method includes modifying, with at least one processor, a profile of ATM activity stored in the distributed cache and associated with the payment device identifier and/or an identifier of the ATM. The profile includes metrics comprising at least ATM transaction value data and ATM transaction count data. The method includes comparing, with at least one processor, at least one metric of the profile of ATM activity to at least one predetermined ATM activity threshold. The method includes, in response to determining that the at least one metric satisfies the at least one predetermined ATM activity threshold, activating, or causing the activation of, with at least one processor, a fraud prevention operation before the user transaction is completed at the ATM. The fraud prevention operation includes at least one of the following: declining the user transaction, disabling a transaction account associated with the payment device identifier, communicating an alert to an issuer, or any combination thereof.

In some non-limiting embodiments or aspects, the ATM may be communicatively connected to the distributed cache and programmed and/or configured to aggregate the transaction data with data from the user transaction during processing of the user transaction.

In some non-limiting embodiments or aspects, (i) comparing the at least one metric to the at least one predetermined ATM activity threshold and (ii) activating, or causing the activation of, the fraud prevention operation may be executed by the ATM in real-time with processing the user transaction.

In some non-limiting embodiments or aspects, the at least one predetermined ATM activity threshold may be generated at least partly by a machine learning model trained on historic transaction data for a plurality of payment devices. The machine learning model may be regularly updated based on the transaction data received in real-time during processing of the transaction data. The at least one predetermined ATM activity threshold may be regenerated at regular intervals at least partly by the machine learning model.

In some non-limiting embodiments or aspects, the at least one metric may further include ATM transaction time data.

The fraud prevention operation may be activated in response to determining a count of ATM transactions associated with the payment device identifier in a time period satisfies the at least one predetermined ATM activity threshold including an upper threshold count of transactions.

In some non-limiting embodiments or aspects, the at least one metric may further include ATM transaction location data. The fraud prevention operation may be activated in response to determining a count of ATM transactions associated with the payment device identifier in a geographic region satisfies the at least one predetermined ATM activity threshold including an upper threshold count of transactions in the geographic region.

In some non-limiting embodiments or aspects, the at least one metric may further include ATM transaction time data and ATM transaction location data. The fraud prevention operation may be activated in response to determining a time interval between a first ATM transaction of the payment device and a second ATM transaction of the payment device satisfies the at least one predetermined ATM activity threshold including a lower threshold time interval. The lower threshold may represent an unlikely or impossible travel time between a location of the first ATM transaction and a location of the second ATM transaction.

According to non-limiting embodiments or aspects, provided is a system for real-time automated teller machine (ATM) fraud detection and prevention. The system includes a distributed cache and a server including at least one processor for executing program instructions. The server is programmed and/or configured to receive transaction data of a plurality of transactions completed by at least one ATM, the transaction data received in real-time during transaction processing at a transaction service provider system. The server is programmed and/or configured to store the transaction data in the distributed cache for aggregation and recall of the transaction data. The server is programmed and/or configured to receive a transaction request for a user transaction at an ATM using a payment device, the transaction request including a payment device identifier. The server is programmed and/or configured to modify a profile of ATM activity stored in the distributed cache and associated with the payment device identifier and/or an identifier of the ATM. The profile includes metrics comprising at least ATM transaction value data and ATM transaction count data. The server is programmed and/or configured to compare at least one metric of the profile of ATM activity to at least one predetermined ATM activity threshold. The server is programmed and/or configured to, in response to determining that the at least one metric satisfies the at least one predetermined ATM activity threshold, activate, or cause the activation of, a fraud prevention operation before the user transaction is completed at the ATM. The fraud prevention operation includes at least one of the following: declining the user transaction, disabling a transaction account associated with the payment device identifier, communicating an alert to an issuer, or any combination thereof.

In some non-limiting embodiments or aspects, the at least one predetermined ATM activity threshold may be generated at least partly by a machine learning model trained on historic transaction data for a plurality of payment devices. The machine learning model may be regularly updated based on the transaction data received in real-time during processing of the transaction data. The at least one predetermined ATM activity threshold may be regenerated at regular intervals at least partly by the machine learning model.

In some non-limiting embodiments or aspects, the at least one metric may further include ATM transaction time data. The fraud prevention operation may be activated in response to determining a count of ATM transactions associated with the payment device identifier in a time period satisfies the at least one predetermined ATM activity threshold including an upper threshold count of transactions.

In some non-limiting embodiments or aspects, the at least one metric may further include ATM transaction location data. The fraud prevention operation may be activated in response to determining a count of ATM transactions associated with the payment device identifier in a geographic region satisfies the at least one predetermined ATM activity threshold including an upper threshold count of transactions in the geographic region.

In some non-limiting embodiments or aspects, the at least one metric may further include ATM transaction time data and ATM transaction location data. The fraud prevention operation may be activated in response to determining a time interval between a first ATM transaction of the payment device and a second ATM transaction of the payment device satisfies the at least one predetermined ATM activity threshold including a lower threshold time interval. The lower threshold may represent an unlikely or impossible travel time between a location of the first ATM transaction and a location of the second ATM transaction.

According to non-limiting embodiments or aspects, provided is a computer program product for real-time automated teller machine (ATM) fraud detection and prevention. The computer program product includes at least one non-transitory computer-readable medium including program instructions that, when executed by at least one processor, cause the at least one processor to receive transaction data of a plurality of transactions completed by at least one ATM. The transaction data is received in real-time during transaction processing at a transaction service provider system. The program instructions further cause the at least one processor to store the transaction data in a distributed cache for aggregation and recall of the transaction data. The program instructions further cause the at least one processor to receive a transaction request for a user transaction at an ATM using a payment device, the transaction request comprising a payment device identifier. The program instructions further cause the at least one processor to modify a profile of ATM activity stored in the distributed cache and associated with the payment device identifier and/or an identifier of the ATM. The profile includes metrics including at least ATM transaction value data and ATM transaction count data. The program instructions further cause the at least one processor to compare at least one metric of the profile of ATM activity to at least one predetermined ATM activity threshold. The program instructions further cause the at least one processor to, in response to determining that the at least one metric satisfies the at least one predetermined ATM activity threshold, activate, or cause the activation of, a fraud prevention operation before the user transaction is completed at the ATM. The fraud prevention operation includes at least one of the following: declining the user transaction, disabling a transaction account associated with the payment device identifier, communicating an alert to an issuer, or any combination thereof.

In some non-limiting embodiments or aspects, the at least one predetermined ATM activity threshold may be generated at least partly by a machine learning model trained on historic transaction data for a plurality of payment devices. The machine learning model may be regularly updated based on the transaction data received in real-time during processing of the transaction data. The at least one predetermined ATM activity threshold may be regenerated at regular intervals at least partly by the machine learning model.

In some non-limiting embodiments or aspects, the at least one metric may further include ATM transaction time data. The fraud prevention operation may be activated in response to determining a count of ATM transactions associated with the payment device identifier in a time period satisfies the at least one predetermined ATM activity threshold including an upper threshold count of transactions.

In some non-limiting embodiments or aspects, the at least one metric may further include ATM transaction location data. The fraud prevention operation may be activated in response to determining a count of ATM transactions associated with the payment device identifier in a geographic region satisfies the at least one predetermined ATM activity threshold including an upper threshold count of transactions in the geographic region.

In some non-limiting embodiments or aspects, the at least one metric may further include ATM transaction time data and ATM transaction location data. The fraud prevention operation may be activated in response to determining a time interval between a first ATM transaction of the payment device and a second ATM transaction of the payment device satisfies the at least one predetermined ATM activity threshold including a lower threshold time interval. The lower threshold may represent an unlikely or impossible travel time between a location of the first ATM transaction and a location of the second ATM transaction.

Further non-limiting embodiments or aspects are set forth in the following numbered clauses:

Clause 1: A computer-implemented method for real-time automated teller machine (ATM) fraud detection and prevention, the method comprising: receiving, with at least one processor, transaction data of a plurality of transactions completed by at least one ATM, the transaction data received in real-time during transaction processing at a transaction service provider system; storing, with at least one processor, the transaction data in a distributed cache for aggregation and recall of the transaction data; receiving, with at least one processor, a transaction request for a user transaction at an ATM using a payment device, the transaction request comprising a payment device identifier; modifying, with at least one processor, a profile of ATM activity stored in the distributed cache and associated with the payment device identifier and/or an identifier of the ATM, the profile comprising metrics comprising at least ATM transaction value data and ATM transaction count data; comparing, with at least one processor, at least one metric of the profile of ATM activity to at least one predetermined ATM activity threshold; and, in response to determining that the at least one metric satisfies the at least one predetermined ATM activity threshold, activating, or causing the activation of, with at least one processor, a fraud prevention operation before the user transaction is completed at the ATM, the fraud prevention operation comprising at least one of the following: declining the user transaction, disabling a transaction account associated with the payment device identifier, communicating an alert to an issuer, or any combination thereof.

Clause 2: The computer-implemented method of clause 1, wherein the ATM is communicatively connected to the distributed cache and programmed and/or configured to aggregate the transaction data with data from the user transaction during processing of the user transaction.

Clause 3: The computer-implemented method of clause 1 or 2, wherein (i) comparing the at least one metric to the at least one predetermined ATM activity threshold and (ii) activating, or causing the activation of, the fraud prevention operation, are executed by the ATM in real-time with processing the user transaction.

Clause 4: The computer-implemented method of any of clauses 1-3, wherein the at least one predetermined ATM activity threshold is generated at least partly by a machine learning model trained on historic transaction data for a plurality of payment devices.

Clause 5: The computer-implemented method of any of clauses 1-4, wherein the machine learning model is regularly updated based on the transaction data received in real-time during processing of the transaction data, and wherein the at least one predetermined ATM activity threshold is regenerated at regular intervals at least partly by the machine learning model.

Clause 6: The computer-implemented method of any of clauses 1-5, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

Clause 7: The computer-implemented method of any of clauses 1-6, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

Clause 8: The computer-implemented method of any of clauses 1-7, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

Clause 9: A system for real-time automated teller machine (ATM) fraud detection and prevention, the system comprising: a distributed cache; and a server including at least one processor for executing program instructions, the server being programmed and/or configured to: receive transaction data of a plurality of transactions completed by at least one ATM, the transaction data received in real-time during transaction processing at a transaction service provider system; store the transaction data in the distributed cache for aggregation and recall of the transaction data; receive a transaction request for a user transaction at an ATM using a payment device, the transaction request comprising a payment device identifier; modify a profile of ATM activity stored in the distributed cache and associated with the payment device identifier and/or an identifier of the ATM, the profile comprising metrics comprising at least ATM transaction value data and ATM transaction count data; compare at least one metric of the profile of ATM activity to at least one predetermined ATM activity threshold; and in response to determining that the at least one metric satisfies the at least one predetermined ATM activity threshold, activate, or cause the activation of, a fraud prevention operation before the user transaction is completed at the ATM, the fraud prevention operation comprising at least one of the following: declining the user transaction, disabling a transaction account associated with the payment device identifier, communicating an alert to an issuer, or any combination thereof.

Clause 10: The system of clause 9, wherein the at least one predetermined ATM activity threshold is generated at least partly by a machine learning model trained on historic transaction data for a plurality of payment devices.

Clause 11: The system of clause 9 or 10, wherein the machine learning model is regularly updated based on the transaction data received in real-time during processing of the transaction data, and wherein the at least one predetermined ATM activity threshold is regenerated at regular intervals at least partly by the machine learning model.

Clause 12: The system of any of clauses 9-11, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

Clause 13: The system of any of clauses 9-12, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

Clause 14: The system of any of clauses 9-13, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

Clause 15: A computer program product for real-time automated teller machine (ATM) fraud detection and prevention, the computer program product comprising at least one non-transitory computer-readable medium including program instructions that, when executed by at least one processor, cause the at least one processor to: receive transaction data of a plurality of transactions completed by at least one ATM, the transaction data received in real-time during transaction processing at a transaction service provider system; store the transaction data in a distributed cache for aggregation and recall of the transaction data; receive a transaction request for a user transaction at an ATM using a payment device, the transaction request comprising a payment device identifier; modify a profile of ATM activity stored in the distributed cache and associated with the payment device identifier and/or an identifier of the ATM, the profile comprising metrics comprising at least ATM transaction value data and ATM transaction count data; compare at least one metric of the profile of ATM activity to at least one predetermined ATM activity threshold; and in response to determining that the at least one metric satisfies the at least one predetermined ATM activity threshold, activate, or cause the activation of, a fraud prevention operation before the user transaction is completed at the ATM, the fraud prevention operation comprising at least one of the following: declining the user transaction, disabling a transaction account associated with the payment device identifier, communicating an alert to an issuer, or any combination thereof.

Clause 16: The computer program product of clause 15, wherein the at least one predetermined ATM activity threshold is generated at least partly by a machine learning model trained on historic transaction data for a plurality of payment devices.

Clause 17: The computer program product of clause 15 or 16, wherein the machine learning model is regularly updated based on the transaction data received in real-time during processing of the transaction data, and wherein the at least one predetermined ATM activity threshold is regenerated at regular intervals at least partly by the machine learning model.

Clause 18: The computer program product of any of clauses 15-17, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

Clause 19: The computer program product of any of clauses 15-18, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

Clause 20: The computer program product of any of clauses 15-19, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
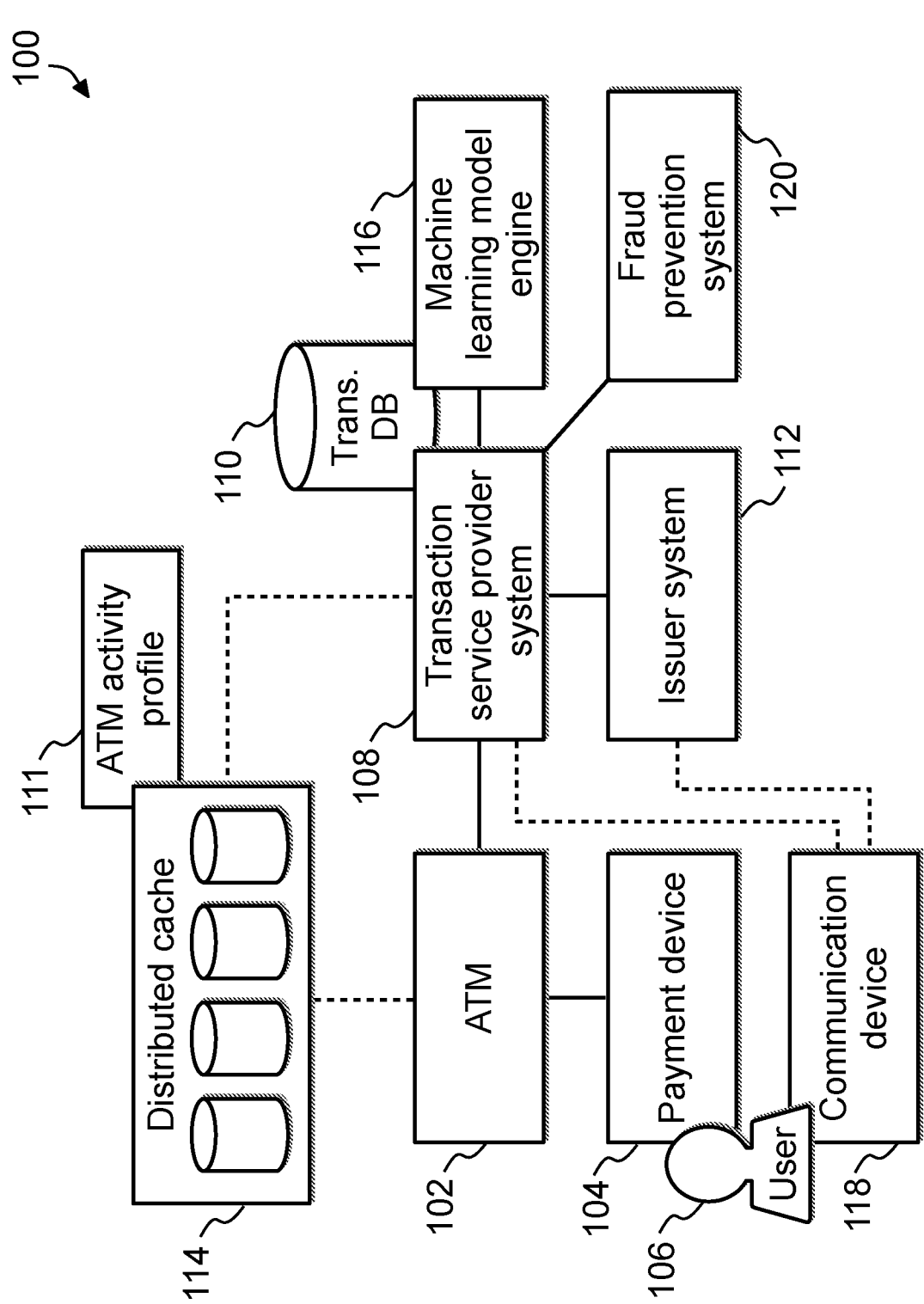
FIG. 1 is a schematic diagram of a non-limiting embodiment or aspect of a system and method for real-time automated teller machine (ATM) fraud detection and prevention.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partly on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side frontend and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for real-time automated teller machine (ATM) fraud detection and prevention. The described arrangement of network architecture and components therein is configured to allow fraudulent ATM transactions to be detected while they are still being processed. Real-time detection and countermeasures outpace existing fraud-flagging and review processes, and described systems may be particularly able to prevent fraudulent transactions from advancing or recurring before transaction completion, thereby preventing loss. Further to that end, by utilizing a fraud analysis process in direct communication with the ATM transaction flow, fraud can be detected and countermeasures engaged before cash withdrawals can occur. The described computer networks further include a distributed cache, which allows for faster data aggregation, data recall, and data analysis.

The described systems and methods further include maintaining a profile of ATM activity for a payment device to be compared against dynamically generated fraud detection thresholds. Dynamic thresholds, particularly those trained on historic transaction data, reduce false positives, which reduces wasted computer time, memory, and resources acting on incorrectly categorized transactions. Moreover, the described metrics of payment device ATM activity are particularly selected to improve the detection of fraudulent behavior by identifying spikes in transaction count and amount, both at an individual ATM and in a region. Moreover, by comparing ATM transaction locations, fraudulent transactions may be identified by transactions that would be unlikely or impossible to complete by one payment device at more than one location.

With specific reference to FIG. 1, and in some non-limiting embodiments or aspects, provided is a system 100 for real-time ATM fraud detection and prevention. The system 100 includes an ATM 102 programmed and/or configured to interface with one or more payment devices 104 of one or more users 106 to complete one or more ATM transactions. In a fraudulent ATM transaction scenario, the payment device 104 may be an authentic payment device 104 of a user 106 or may be a counterfeit payment device 104, e.g., a replicated credit card. When a user 106 wants to complete an ATM transaction, the user 106 may present their payment device 104 for authentication at the ATM 102. The payment device 104 may be identified by the ATM 102 using a payment device 104 identifier, which may be stored in a variety of mediums and communicated to the ATM 102 in a variety of ways. The payment device 104 may be a credit card, in which case a payment device 104 identifier may be stored on a chip or magnetic strip on the card, and the ATM 102 may include a chip reader or magnetic strip reader to receive the payment device identifier from the payment device 104. The payment device 104 may also be an electronic payment device, and the payment identifier may be communicated from the electronic payment device to the ATM 102, such as through encrypted wireless communication. The ATM 102 may require a user 106 to present or input additional data to verify the identity of the payment device 104 and/or the user 106. For example, the user 106 may be prompted to enter a personal identification number (PIN) for the payment device 104. The user 106 may also be prompted for a password, a biometric scan, or other like identifier.

The ATM 102 may communicate with a transaction service provider system 108 to authenticate the payment device 104 and/or the user 106. After a payment device 104 is identified, the user 106 may interface with the ATM 102 to initiate an ATM transaction. For an ATM transaction that is a cash withdrawal, the user 106 may input a requested amount to be withdrawn from a transaction account associated with the payment device 104 and dispensed from the ATM 102. The ATM 102 may generate a transaction authorization request for the ATM transaction and communicate the transaction authorization request to the transaction service provider system 108. The transaction authorization request may include a payment device identifier, which may be encrypted. The ATM 102, the transaction service provider system 108, or another computing device may communicate with a distributed cache 114 to generate and/or modify a stored profile of ATM activity, which may be associated with the payment device identifier, an ATM identifier, or the like. The distributed cache 114 may include a plurality of servers, which allows for fast aggregation of data, efficient recall of data, and modularity for future growth of the distributed cache 114 to allow for increased communicative capacity. The distributed cache 114 may be included in and/or associated with a transaction service provider system 108. The profile of ATM activity may include one or metrics of ATM activity associated with a payment device 104 or an ATM 102, including, but not limited to: ATM transaction value data; ATM transaction count data; ATM transaction time data; ATM transaction location data; ATM identifier data; issuer identifier data; and/or the like.

The ATM 102, the transaction service provider system 108, or another computing device may compare one or more metrics of the profile of ATM activity to at least one predetermined ATM activity threshold. For example, ATM transaction value data may be compared to an upper predetermined threshold of transaction value. Furthermore, ATM transaction count data may be compared to an upper predetermined threshold of transaction count. See FIGS. 6 and 7 and their corresponding discussion for further non-limiting embodiments or aspects of evaluating metrics in relation to predetermined ATM activity thresholds. It will be appreciated that many configurations are possible.

The one or more predetermined ATM activity thresholds may be generated at least partly by a machine learning model trained on historic transaction data for one or more payment devices 104. The transaction service provider system 108 may include or be communicatively connected to a machine learning model engine 116 that accepts historic transaction data as a model input and generates recommended ATM activity thresholds that may be indicative of fraud associated with a payment device 104. Transaction data for one or more payment devices 104 may be stored in real-time relative to the processing of transactions by the transaction service provider system 108. Thresholds may be generated specific to a payment device 104, group of payment devices 104, or made general to all payment devices 104. For thresholds specific to a particular payment device 104, the machine learning model of the machine learning model engine 116 may be trained on historic transaction data of a specific payment device 104, may be trained on similar payment devices 104 (e.g., transactions of a plurality of payment devices 104 at an ATM), and/or may be trained on a wider or entire sample of payment devices 104. The transaction service provider system 108 may include or be communicatively connected to a transaction database 110 for storing historic transaction data. Historic transaction data may be stored, in addition to or instead of the transaction database 110, in the distributed cache 114. The machine learning model may be regularly updated (e.g., re-trained, iterated over additional generations, etc.) based on transaction data received in real-time during processing of the transaction data. Relatedly, generated predetermined ATM activity thresholds may be regenerated at regular intervals (e.g., hourly, daily, weekly, monthly, etc.) at least partly by the machine learning model.

The transaction service provider system 108 may include or be communicatively connected to a fraud prevention system 120 that is programmed and/or configured to execute one or more anti-fraud prevention measures in response to reported or detected fraudulent transactions. In response to the ATM 102 and/or transaction service provider system 108 determining that one or more metrics satisfies one or more predetermined ATM activity thresholds, the ATM 102 and/or the transaction service provider system 108 may communicate with the fraud prevention system 120 to activate, or cause the activation of, one or more fraud prevention operations. Fraud prevention operations may include, but are not limited to: declining a user transaction (e.g., declining the triggering ATM transaction, declining future payment device transactions, etc.); disabling a transaction account associated with the payment device identifier (e.g., total disable, conditional disable that allows transactions only of a certain type or origin, such as pre-scheduled payments, etc.); communicating an alert (e.g., to a communication device 118 of a user 106 of the payment device 104, to an issuer system 112 associated with an issuer of the payment device 104, etc.); and/or the like. Alerts communicated to an issuer system 112 may be automatically forwarded or trigger new alerts to a communication device 118 of the user 106 if the user 106 only maintains their contact information with an issuer of the payment device 104.

With further reference to FIG. 1, and in further non-limiting embodiments or aspects, the ATM 102 may be communicatively connected to the distributed cache 114, so as to expedite evaluation of an associated profile of ATM activity at the time of an ATM transaction. The ATM 102 may communicate with the distributed cache 114 to aggregate transaction data of a present ATM transaction, during user 106 interaction with the ATM 102, to allow the comparison of metrics of the profile to predetermined thresholds in real-time with ATM transaction processing. If the ATM 102 conducts the comparison step of the profile of ATM activity with predetermined thresholds, the ATM 102 may communicate with the distributed cache 114 to retrieve metrics of the profile of ATM activity and complete the comparisons in real-time to transaction processing. The ATM 102 may activate, or cause the activation of, one or more fraud prevention operations by communicating with the fraud prevention system 120, which may be relayed by the transaction service provider system 108. Activation of one or more fraud prevention operations may be in real-time with processing the present ATM transaction.

Figure 2:
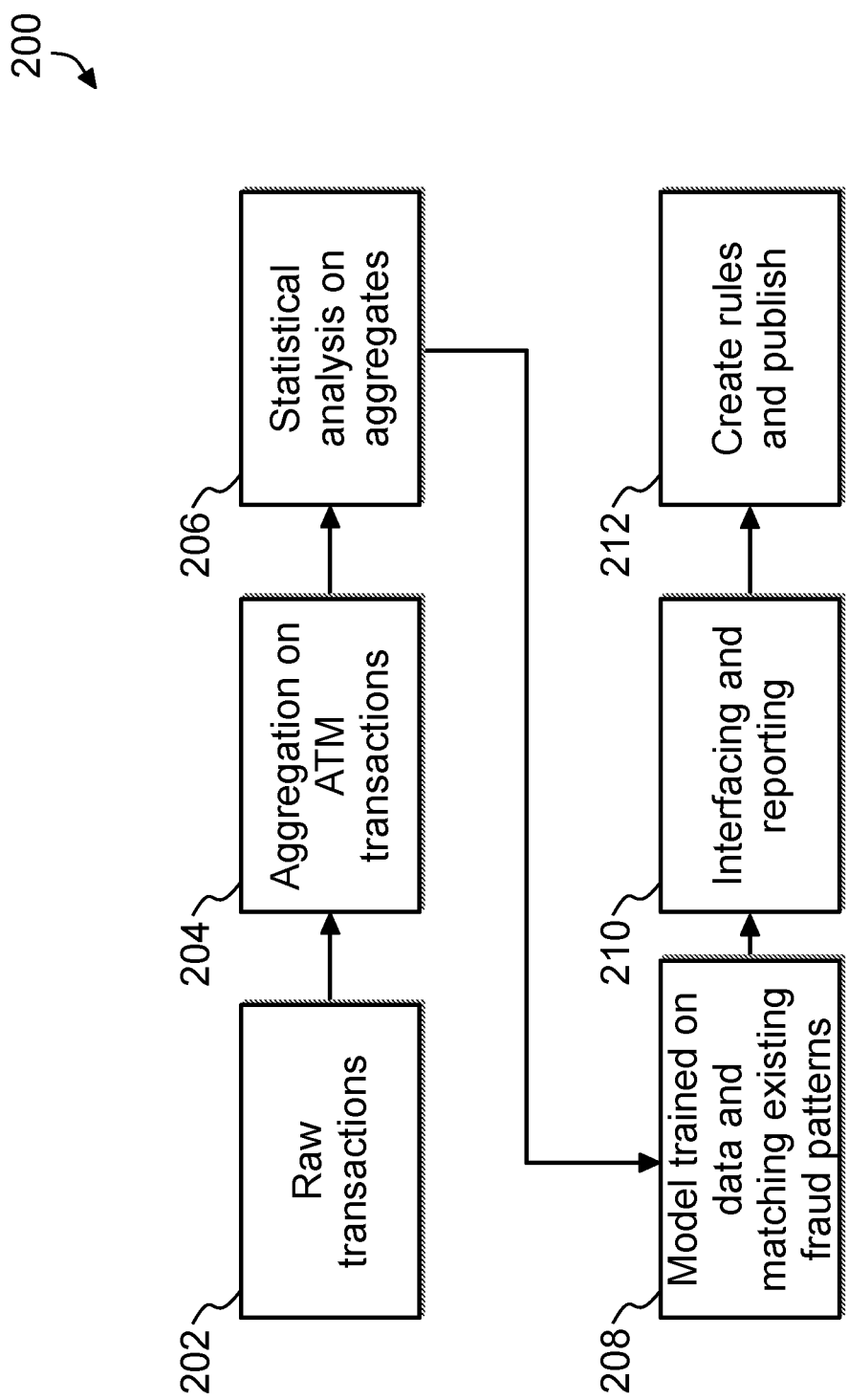
FIG. 2 is a process diagram of a non-limiting embodiment or aspect of a system and method for real-time ATM fraud detection and prevention.

With specific reference to FIG. 2, and in non-limiting embodiments or aspects, provided is a process 200 of a system and method for real-time automated teller machine (ATM) fraud detection and prevention. Each step of the process 200 may be completed by one or more ATMs, a transaction service provider system, a fraud prevention system, a machine learning model engine, and/or other computing devices. In step 202, raw transactions are received at one or more ATMs. In step 204, the transaction service provider system may aggregate ATM transaction data of the raw transactions by modifying one or more profiles of ATM activity stored in a transaction database and/or distributed cache. Aggregation may be based on ATM transaction value data, ATM transaction account data, or other like variables. Aggregation may be on the level of payment device, ATM, issuer of payment devices, institution associated with ATMs, or region of ATMs. Aggregations may be used to detect anomalous transaction behavior based on non-supervised model learning. Techniques such as multivariate Gaussian distribution may be used to complement unsupervised machine learning to help determine anomalies across groups of payment devices or ATMs based on aggregate transaction patterns (e.g., on the premise that 99.7% of data is within three standard deviations of a mean, 95% of data is within two standard deviations of a mean, and 68% of data is within one standard deviation of a mean). To aid in making aggregation and anomaly detection processes performant, ATM transaction data may be aggregated to store attributes such as time data, amount data, count data, ATM identifier data, issuer identifier data, location data, and/or the like.

A distributed cache may be provided for fast aggregation of real-time transaction data, during the processing of transactions by a transaction service provider system. A back end server, such as a server of a transaction service provider system, may aggregate totals at the ATM device level and/or payment device level, such as total transaction amounts at the ATM and/or using the payment device, number of transactions at the ATM and/or using the payment device, frequency of activity (e.g., card authentication, withdrawal, etc.) at the ATM and/or using the payment device, and/or the like. The back end server may further aggregate totals at a geographical vicinity including or nearby the ATM (e.g., 1-mile radius from ATM, zip code, city region, country region, etc.). Aggregates may account for and record payment device identifiers to detect simultaneous coordinated withdrawal attacks across multiple locations. Because of the short time frame to detect fraud and deny ATM transactions, especially transactions of a simultaneous coordinated withdrawal attack, a fast distributed cache that is communicatively connected to a transaction service provider system allows for aggregation, comparison, and detection while transactions are being processed. If predetermined thresholds are satisfied (e.g., met and/or exceeded) at the time of aggregate computation, then downstream systems may be automatically triggered to close, modify, and/or report one or more transaction accounts.

ATM network transaction data as an input for aggregation using a distributed cache may include PIN authentication communications, balance check communications, withdrawal transaction communications, and/or the like. Such communications may be fed into to a real-time aggregation computation engine, which may be operated at a transaction service provider system. The output of such a system may include, but is not limited to: real-time notifications to halt a transaction (e.g., based on time correlation and heuristic limits set by models to detect anomalous transactions); reports to issuers and/or payment networks that individual or coordinated cash out fraud is happening in real-time; real-time block rules, triggered to block further transactions if an issuer of a payment device is enrolled in an integrated rule system with a transaction service provider system.

With further reference to FIG. 2, and in further non-limiting embodiments or aspects, the process 200 includes step 206, where a transaction service provider system may conduct statistical analysis on aggregates. Step 206 may include post-aggregate data conditioning and review, which may add multiple data feeds (such as aggregating location data using location services) or pre-computed attributes. In step 208, the transaction service provider system may execute a model trained on historic transaction data and existing fraudulent transaction patterns that match current transaction patterns. The transaction processing server system, particularly a machine learning model engine thereof communicatively connected thereto, may have multiple thresholds and the model may adjust between thresholds to attain a balance between stopping cash withdrawals and allowing regular customer usage patterns. The thresholds may be enforced by a transaction service provider system and may be opted-in or opted-out of by issuers.

A first preferred non-limiting machine learning model may be a decision tree algorithm. A decision tree algorithm matches input data to an expected output or well-known output. A second preferred non-limiting machine learning model may be a clustering algorithm. A clustering algorithm is mostly unsupervised and can predict a threshold that may not have been previously known, and furthermore, clustering algorithms may change dynamically over time. A third preferred non-limiting machine learning model may be a linear regression model, as supervised learning on existing fraud patterns can be performed with linear regression. A machine learning model to detect fraudulent transaction patterns and/or set predetermined thresholds may be trained on historic transaction data, and known fraudulent transactions and valid transaction may be flagged as inputs for the machine learning model. Machine learning models maybe be trained regularly (e.g., hourly, daily, weekly, etc.) so that thresholds can be adjusted based on new transaction patterns.

With further reference to FIG. 2, and in further non-limiting embodiments or aspects, the process 200 includes step 210, where a transaction service provider system completes interfacing and reporting. In step 210, the fraud prevention system may recommend certain actions to be performed, or may automatically act on predetermined rules. Fraud response rules may determine what types of further transactions to be blocked or restricted based on amount, type, time, location, and/or the like. The fraud prevention system may also recommend or cause a further follow-up with a user of a payment device that has initiated a threshold-satisfying ATM transaction. The fraud prevention system may generate a primary report where a sudden spike in cash-out fraud activity is detected and may notify the transaction service provider system to take additional fraud prevention measures. In step 212, the transaction service provider system may create and publish rules on behalf of issuers. Issuers may set limits for aggregate values or counts of transactions for certain payment devices or for a region. For example, an issuer may predetermine a rule that if a same PIN is used simultaneously, or substantially simultaneously, across more than one ATM, then the transaction may be designated as fraudulent. The issuer may also predetermine a rule that if a count of withdrawals meets or exceeds an expected threshold (e.g., a heuristic-derived or model-derived threshold), then a corresponding transaction account may be disabled.

Figure 3:
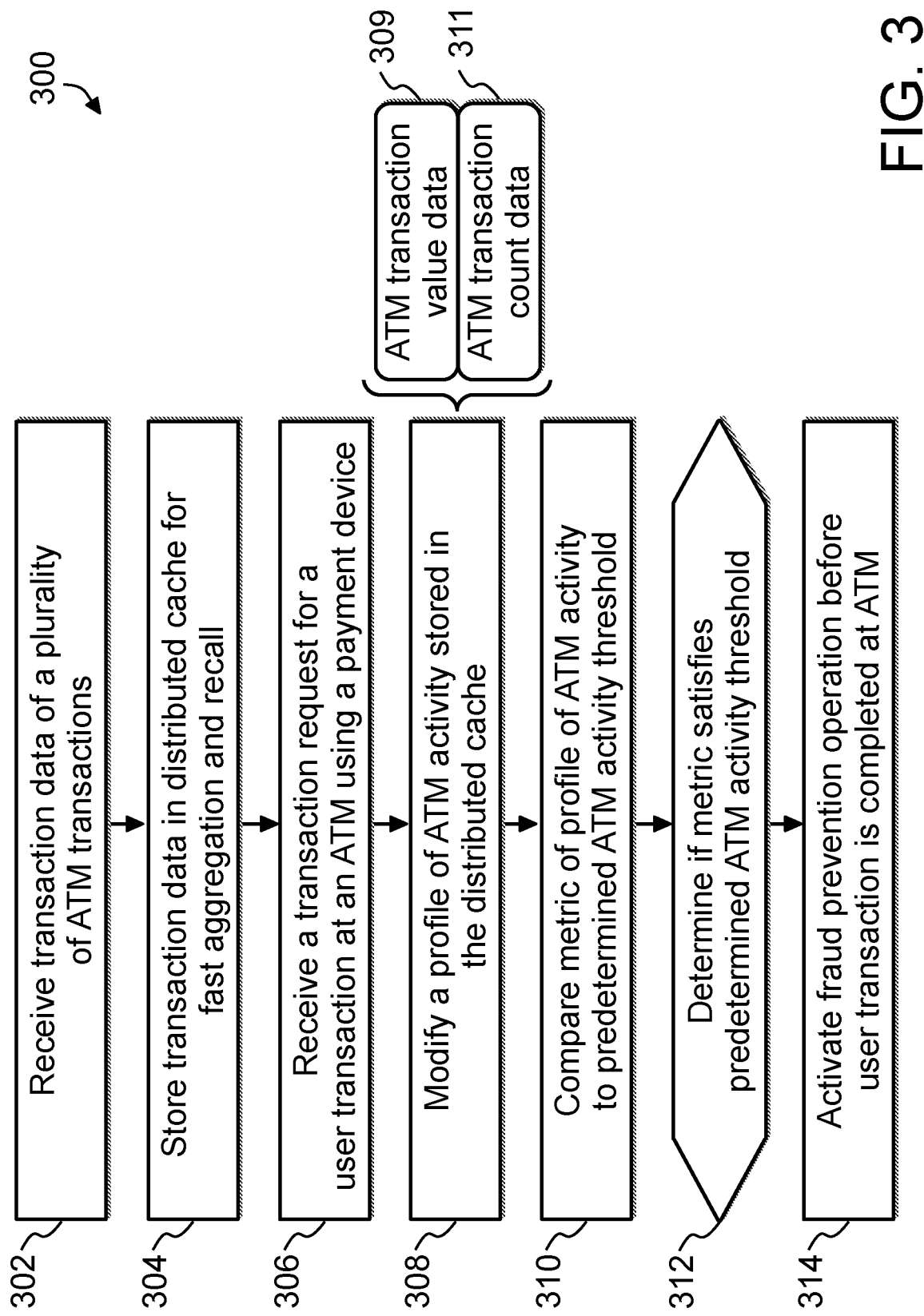
FIG. 3 is a process diagram of a non-limiting embodiment or aspect of a system and method for real-time ATM fraud detection and prevention.

With specific reference to FIG. 3, and in non-limiting embodiments or aspects, provided is a process 300 of a system and method for real-time automated teller machine (ATM) fraud detection and prevention. Each step of the process 300 may be completed by one or more ATMs, a transaction service provider system, a fraud prevention system, a machine learning model engine, and/or other computing devices. In step 302, a transaction service provider system may receive transaction data of a plurality of transactions completed by at least one ATM. The transaction data may be received in real-time during transaction processing at the transaction service provider system. In step 304, the transaction service provider system may store the transaction data in a distributed cache for aggregation and recall of the transaction data. In step 306, the transaction service provider system may receive a transaction request for a user transaction at an ATM using a payment device. The transaction request may include a payment device identifier. In step 308, the transaction service provider system may modify a profile of ATM activity stored in the distributed cache. The profile of ATM activity may be associated with a payment device identifier or an ATM identifier. The profile of ATM activity may have metrics including, but not limited to: ATM transaction value data 309; ATM transaction count data 311; ATM transaction time data; ATM transaction location data; ATM identifier; issuer identifier; payment device identifier; and/or the like. The modification to the profile of ATM activity may entail aggregating one or more metrics based on the present transaction (e.g., incrementing transaction count, adding transaction value, etc.). Aggregates may also be reset periodically to zero, such as at the start of a new time period for observation by a transaction service provider system.

In step 310, the transaction service provider system may compare at least one metric of the profile of ATM activity to at least one predetermined ATM activity threshold. In step 312, which may be included in step 310, the transaction service provider system may determine if the metric satisfies a predetermined ATM activity threshold. If no threshold is satisfied, then the transaction service provider system may continue monitoring ongoing transactions without initiating any fraud prevention operations. However, in response to determining that at least one metric of the profile of ATM activity satisfies at least one predetermined ATM activity threshold, step 314 may be executed. In step 314, the transaction service provider system may activate, or cause the activation of, one or more fraud prevention operations. Fraud prevention operations may include, but are not limited to: declining a user transaction; disabling a transaction account associated with the payment device identifier; communicating an alert to a user and/or an issuer; and/or the like.

Figure 4:
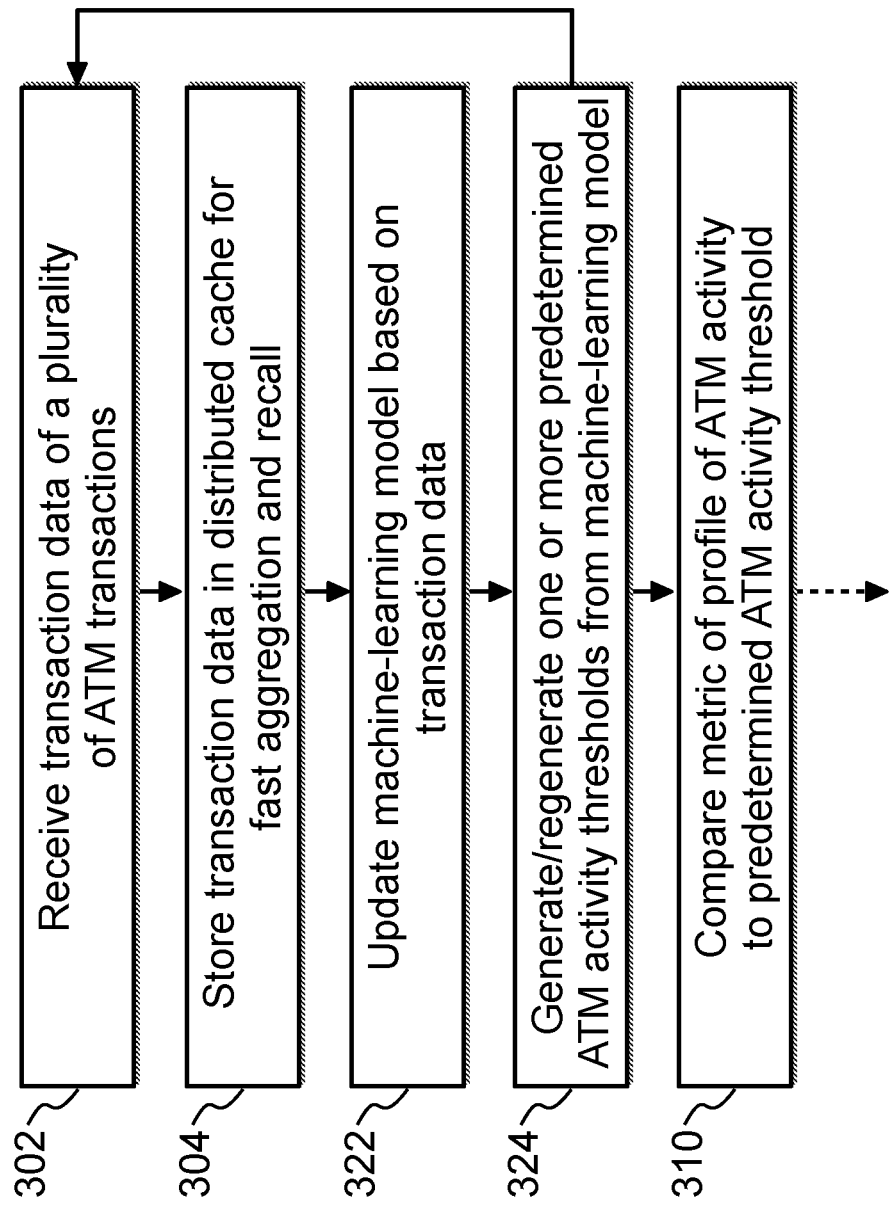
FIG. 4 is a process diagram of a non-limiting embodiment or aspect of a system and method for real-time ATM fraud detection and prevention.

With specific reference to FIG. 4, and in non-limiting embodiments or aspects, provided is an expansion of process 300 of a system and method for real-time automated teller machine (ATM) fraud detection and prevention. Each step of the process 300 may be completed by one or more ATMs, a transaction service provider system, a fraud prevention system, a machine learning model engine, and/or other computing devices. Depicted is a recursive set of operations to continually refresh and auto-correct the underlying machine learning model. In step 302, a transaction service provider system may receive transaction data of a plurality of transactions completed by at least one ATM. The transaction data may be received in real-time during transaction processing at the transaction service provider system. In step 304, the transaction service provider system may store the transaction data in a distributed cache for aggregation and recall of the transaction data.

In step 322, the machine learning model may be updated by the transaction service provider system (e.g., a machine learning model engine) based on the transaction data received in real-time during processing of the transaction data. The machine learning model may be retrained, iterated, augmented, modified, and/or the like to account for the new transaction data. At least a portion of prior transaction data that may have been used to train the machine learning model previously may be phased out and not used for subsequent trainings, thereby allowing the machine learning model to remain dynamic and accurate for current transaction patterns and trends. In step 324, one or more predetermined ATM activity thresholds may be generated or regenerated by the transaction service provider system (e.g., a machine learning model engine) based on the updated machine learning model. Thereafter, in step 310, the transaction service provider system may compare at least one metric of the profile of ATM activity to at least one predetermined ATM activity threshold. The transaction service provider system may regularly repeat steps 302, 304, 322, and 324 to update the machine learning model based on the latest transaction data, and substantially in real-time with the processing of transactions as they occur due to the advantageous position of the transaction service provider system in the network.

Figure 5:
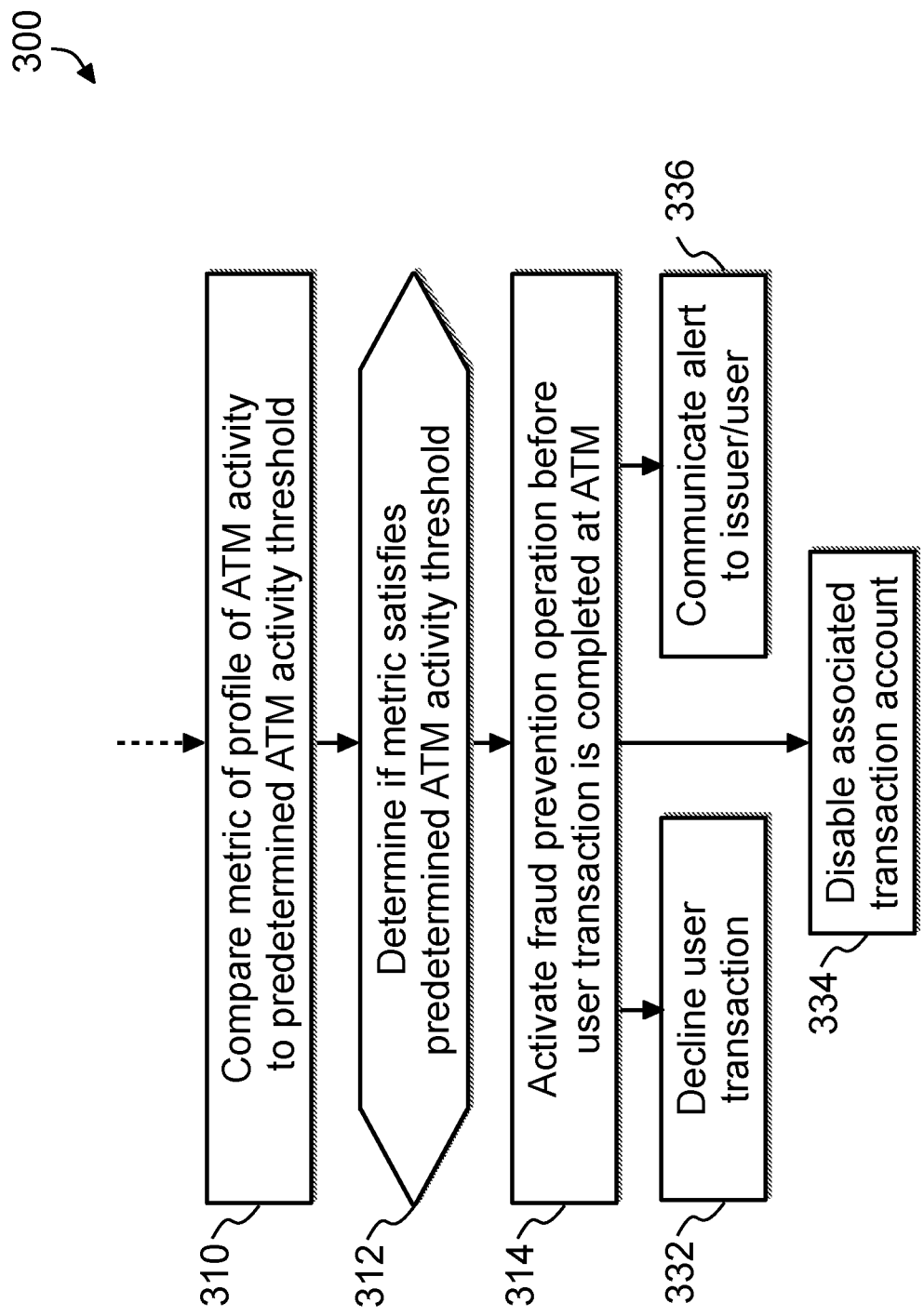
FIG. 5 is a process diagram of a non-limiting embodiment or aspect of a system and method for real-time ATM fraud detection and prevention.

With specific reference to FIG. 5, and in non-limiting embodiments or aspects, provided is an expansion of process 300 of a system and method for real-time automated teller machine (ATM) fraud detection and prevention. Each step of the process 300 may be completed by one or more ATMs, a transaction service provider system, a fraud prevention system, a machine learning model engine, and/or other computing devices. Depicted is a detail of post-threshold-satisfaction operations to prevent current and/or future fraudulent transactions. In step 310, the transaction service provider system may compare at least one metric of the profile of ATM activity to at least one predetermined ATM activity threshold. In step 312, which may be included in step 310, the transaction service provider system may determine if the metric satisfies a predetermined ATM activity threshold. If no threshold is satisfied, then the transaction service provider system may continue monitoring ongoing transactions without initiating any fraud prevention operations. However, in response to determining that at least one metric of the profile of ATM activity satisfies at least one predetermined ATM activity threshold, step 314 may be executed. In step 314, the transaction service provider system may activate, or cause the activation of, one or more fraud prevention operations.

In step 332, as a fraud prevention operation, the transaction service provider system may decline a user transaction. Step 332 may cause the current ATM transaction, which may have caused a predetermined ATM activity threshold to be satisfied, to be declined. Because the aggregation, detection, and fraud prevention operation may be conducted in real-time during the processing of an original ATM transaction, the original ATM transaction may be aborted before it is completed. In this manner, fraudulent ATM transactions, such as fraudulent withdrawal requests using a fake payment device or unauthorized payment device, may be declined before the fraud is ultimately successful, such as before money is dispensed from an ATM. Step 332 may also include the declining of one or more future user transactions using the payment device associated with fraudulent ATM activity.

In step 334, as a fraud prevention operation, the transaction service provider system may communicate with an issuer system to disable a transaction account associated with a payment device of the current user transaction. The transaction service provider system may also, with or without action by the issuer system, effectively disable the payment device by declining all future transactions originating from the payment device. Because the transaction service provider system acts as a channel for receiving transaction authorization requests and transaction authorization responses, the transaction service provider system may be particularly situated to disable payment device transaction activity before an issuer system can investigate and respond of its own accord.

In step 336, as a fraud prevention operation, the transaction service provider system may communicate an alert, or cause the communication of an alert, to an issuer system and/or user associated with the payment device being used in the present ATM transaction. The issuer system may itself communicate an alert to the user if the user correspondence information is stored with the issuer system and not the transaction service provider system. The alert may include information about the present transaction including its time, location, amount, and/or the like. The alert may also notify the issuer and/or user of other fraud prevention operations that have been activated, including declined transactions, disabled transaction accounts, and/or the like. The user may receive the alert on a communication device (e.g., mobile device) during the processing of the ATM transaction that may have triggered the ATM activity threshold to be satisfied. Reduced latency in alert notifications, provided by the described system herein, allows for fraud to be resolved quicker and reduces asymmetric information between users and payment device issuers. It will further be appreciated that the previously described fraud prevention operations may be executed individually or in combination with other fraud prevention operations.

Figure 6:
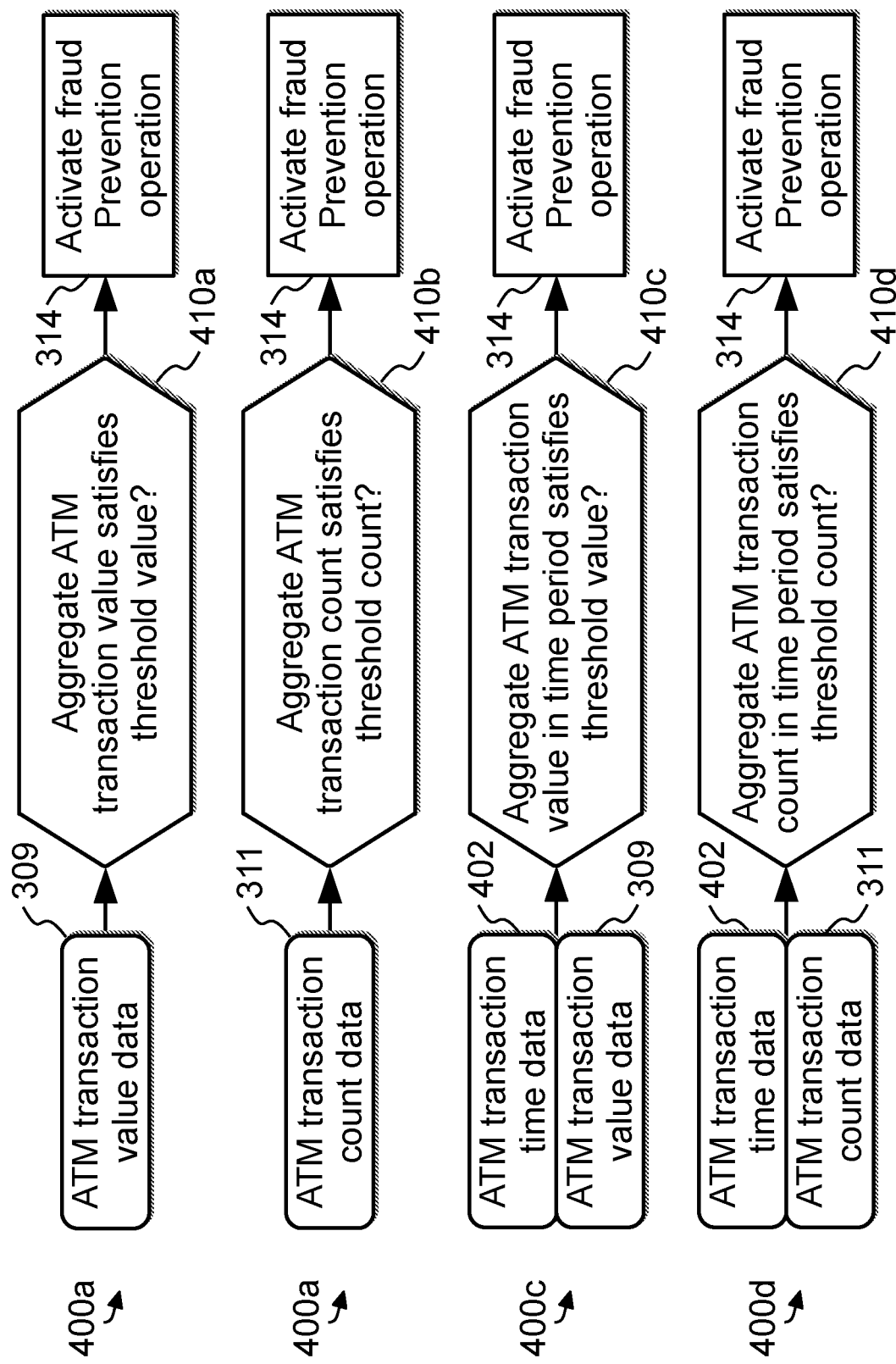
FIG. 6 is a series of process flows of a non-limiting embodiment or aspect of a system and method for real-time ATM fraud detection and prevention.

With specific reference to FIG. 6, and in non-limiting embodiments or aspects, provided are a series of process flows 400a-400d of a system and method for real-time automated teller machine (ATM) fraud detection and prevention. Each process flow may be completed by one or more ATMs, a transaction service provider system, a fraud prevention system, a machine learning model engine, and/or other computing devices. The depicted process flows 400a-400d provide non-limiting examples of metrics of profiles of ATM activity to be compared with predetermined ATM activity thresholds for the triggering of fraud prevention operations. In process flow 400a, a profile of ATM activity may include the metric of ATM transaction value data 309. ATM transaction value data 309 may be aggregated for an ATM, a payment device, a series of ATMs (e.g., belonging to a particular issuer), or a combination thereof. A predetermined threshold value may be generated at least partly by a machine learning model. In step 410a, a transaction service provider system may determine if the aggregate ATM transaction value data 309 satisfies (e.g., equals, exceeds, etc.) a predetermined threshold value. If the threshold value is satisfied, a fraud prevention operation may be activated by a transaction service provider system in step 314. For example, a present ATM transaction for the withdrawal of $100 may be received. An aggregate transaction value for an ATM, with the addition of the present ATM transaction, may be determined to be $5085. A machine learning model may have generated a predetermined threshold value for the ATM to be $5000. The present ATM transaction may satisfy the threshold and, therefore, trigger the activation of a fraud prevention operation, such as declining the immediate ATM withdrawal request, preventing future transactions between payment devices and the ATM, and/or the like.

With further reference to FIG. 6, and in further non-limiting embodiments or aspects, in process flow 400b, a profile of ATM activity may include the metric of ATM transaction count data 311. ATM transaction count data 311 may be aggregated for an ATM, a payment device, a series of ATMs (e.g., belonging to a particular issuer), or a combination thereof. A predetermined threshold count may be generated at least partly by a machine learning model. In step 410b, a transaction service provider system may determine if the aggregate ATM transaction count data 311 satisfies (e.g., equals, exceeds, etc.) a predetermined threshold count. If the threshold count is satisfied, a fraud prevention operation may be activated by a transaction service provider system in step 314. For example, a present ATM transaction may be received. An aggregate transaction count for the payment device, with the addition of the present ATM transaction, may be determined to be 3. A machine learning model may have generated a predetermined threshold count for the payment device to be 3. The present ATM transaction may satisfy the threshold and, therefore, trigger the activation of a fraud prevention operation, such as declining the immediate ATM withdrawal request, disabling the payment device or an associated transaction account, and/or the like.

With further reference to FIG. 6, and in further non-limiting embodiments or aspects, in process flow 400c, a profile of ATM activity may include the metrics of ATM transaction time data 402 and ATM transaction value data 309. ATM transaction value data 309 may be aggregated for an ATM, a payment device, a series of ATMs (e.g., belonging to a particular issuer), or a combination thereof. A predetermined threshold value may be generated at least partly by a machine learning model. In step 410c, a transaction service provider system may determine if the aggregate ATM transaction value data 309 satisfies (e.g., equals, exceeds, etc.) a predetermined threshold value for a time period. If the threshold value is satisfied, a fraud prevention operation may be activated by a transaction service provider system in step 314. For example, a present ATM transaction may be received. An aggregate transaction value for the payment device, with the addition of the present ATM transaction, for a given time period (e.g., hour, day, week, etc.) may be determined to be $550. A machine learning model may have generated a predetermined threshold value for the payment device in the given time period to be $300. The present ATM transaction may satisfy the threshold and, therefore, trigger the activation of a fraud prevention operation, such as declining the immediate ATM withdrawal request, disabling the payment device or an associated transaction account, and/or the like.

With further reference to FIG. 6, and in further non-limiting embodiments or aspects, in process flow 400d, a profile of ATM activity may include the metrics of ATM transaction time data 402 and ATM transaction count data 311. ATM transaction count data 311 may be aggregated for an ATM, a payment device, a series of ATMs (e.g., belonging to a particular issuer), or a combination thereof. A predetermined threshold count may be generated at least partly by a machine learning model. In step 410d, a transaction service provider system may determine if the aggregated ATM transaction count data 311 satisfies (e.g., equals, exceeds, etc.) a predetermined threshold count for a time period. If the threshold count is satisfied, a fraud prevention operation may be activated by a transaction service provider system in step 314. For example, a present ATM transaction may be received. An aggregate transaction count for the ATM, with the addition of the present ATM transaction, for a given time period (e.g., hour, day, week, etc.) may be determined to be 27. A machine learning model may have generated a predetermined threshold count for the ATM in the given time period to be 27. The present ATM transaction may satisfy the threshold and, therefore, trigger the activation of a fraud prevention operation, such as declining the immediate ATM withdrawal request, preventing future transactions between payment devices and the ATM, and/or the like.

Figure 7:
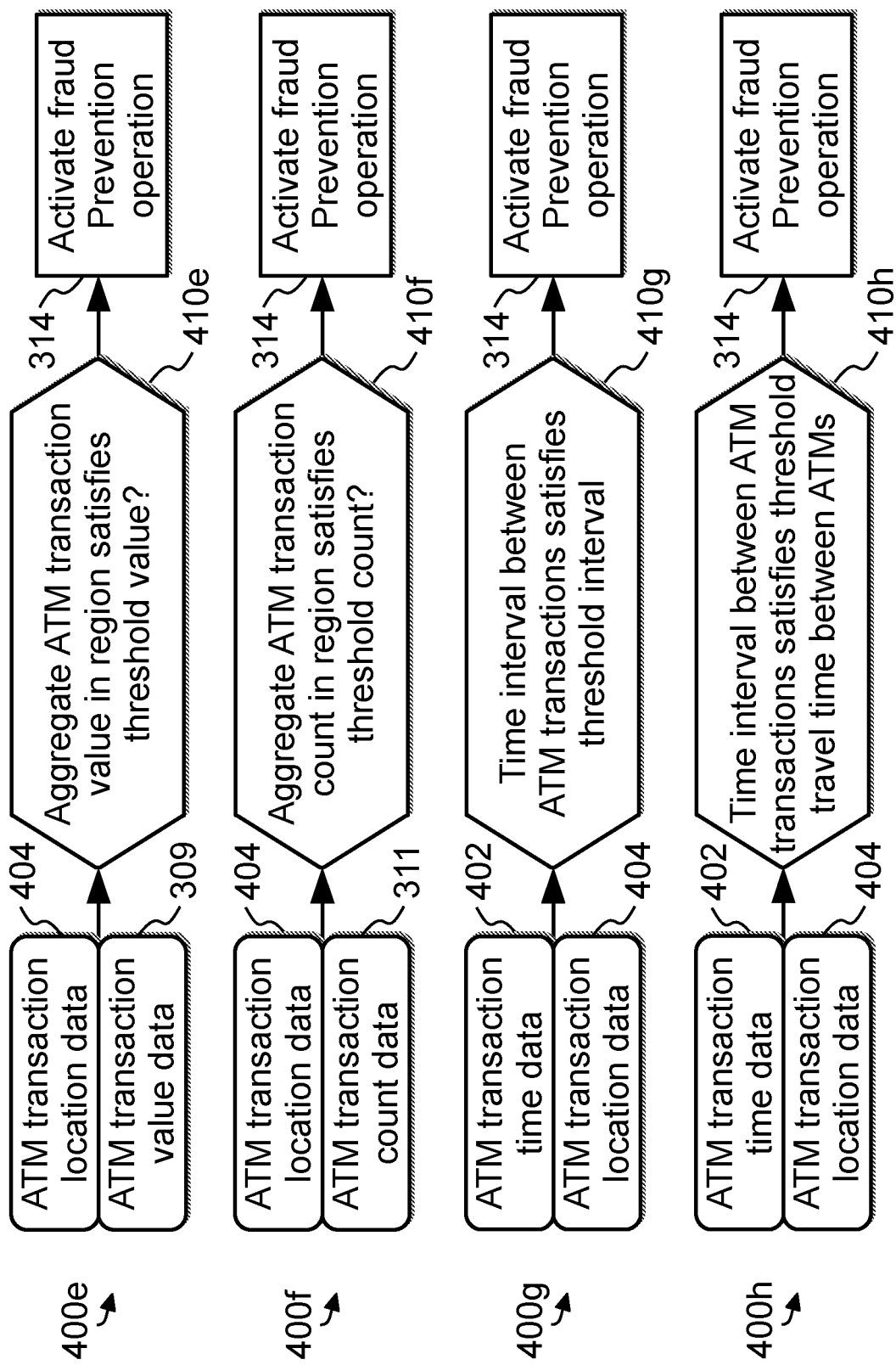
FIG. 7 is a series of process flows of a non-limiting embodiment or aspect of a system and method for real-time ATM fraud detection and prevention.

With specific reference to FIG. 7, and in non-limiting embodiments or aspects, provided are a series of process flows 400e-400h of a system and method for real-time automated teller machine (ATM) fraud detection and prevention. Each process flow may be completed by one or more ATMs, a transaction service provider system, a fraud prevention system, a machine learning model engine, and/or other computing devices. The depicted process flows 400e-400h provide non-limiting examples of metrics of profiles of ATM activity to be compared with predetermined ATM activity thresholds for the triggering of fraud prevention operations. In process flow 400e, a profile of ATM activity may include the metrics of ATM transaction location data 404 and ATM transaction value data 309. ATM transaction value data 309 may be aggregated for an ATM, a payment device, a series of ATMs (e.g., belonging to a particular issuer), or a combination thereof, in a given region based on ATM transaction location data 404. A predetermined threshold value may be generated at least partly by a machine learning model. In step 410e, a transaction service provider system may determine if the aggregate ATM transaction value data 309 satisfies (e.g., equals, exceeds, etc.) a predetermined threshold value for a region. If the threshold value is satisfied, a fraud prevention operation may be activated by a transaction service provider system in step 314. For example, a present ATM transaction may be received. An aggregate transaction value for the payment device, with the addition of the present ATM transaction, for a given region (e.g., zip code, radial distance, county, city, etc.) may be determined to be $650. A machine learning model may have generated a predetermined threshold value for the payment device in the given region to be $500. The present ATM transaction may satisfy the threshold and, therefore, trigger the activation of a fraud prevention operation, such as declining the immediate ATM withdrawal request, disabling the payment device or an associated transaction account, and/or the like. The foregoing comparison may further be based on ATM transaction time data 402 to limit the aggregate/comparison to a given time period.

With further reference to FIG. 7, and in further non-limiting embodiments or aspects, in process flow 400f, a profile of ATM activity may include the metrics of ATM transaction location data 404 and ATM transaction count data 311. ATM transaction count data 311 may be aggregated for an ATM, a payment device, a series of ATMs (e.g., belonging to a particular issuer), or a combination thereof, in a given region based on ATM transaction location data 404. A predetermined threshold count may be generated at least partly by a machine learning model. In step 410f, a transaction service provider system may determine if the aggregate ATM transaction count data 311 satisfies (e.g., equals, exceeds, etc.) a predetermined threshold count for a region. If the threshold count is satisfied, a fraud prevention operation may be activated by a transaction service provider system in step 314. For example, a present ATM transaction may be received. An aggregate transaction count for a series of ATMs, with the addition of the present ATM transaction, in a given region (e.g., zip code, radial distance, county, city, etc.) may be determined to be 70. A machine learning model may have generated a predetermined threshold count for ATMs in the given region to be 70. The present ATM transaction may satisfy the threshold and therefore trigger the activation of a fraud prevention operation, such as declining the immediate ATM withdrawal request, preventing future transactions between payment devices and one or more ATMs in the region, and/or the like. The foregoing comparison may further be based on ATM transaction time data 402 to limit the aggregate/comparison to a given time period.

With further reference to FIG. 7, and in further non-limiting embodiments or aspects, in process flow 400g, a profile of ATM activity may include the metrics of ATM time data 402 and ATM transaction location data 404. ATM transaction data may be aggregated to determine a time interval between first and second ATM transactions for a payment device at first and second ATM locations (determined by location services, an ATM identifier look-up, etc.). A predetermined threshold interval, as a lower bound, may be generated at least partly by a machine learning model. In step 410g, a transaction service provider system may determine that the time interval between the first and second ATM transactions satisfies (e.g., equals, exceeds, etc.) a predetermined threshold interval. If the threshold interval is satisfied, a fraud prevention operation may be activated by a transaction service provider system in step 314. For example, a present ATM transaction may be received. A time interval between the present ATM transaction at the present location and a prior ATM transaction at a prior location may be 5 minutes. A machine learning model may have generated a predetermined threshold interval to be 15 minutes. The present ATM transaction may satisfy the threshold and, therefore, trigger the activation of a fraud prevention operation, such as declining the immediate ATM withdrawal request, disabling the payment device or an associated transaction account, and/or the like.

With further reference to FIG. 7, and in further non-limiting embodiments or aspects, in process flow 400h, a profile of ATM activity may include the metrics of ATM time data 402 and ATM transaction location data 404. ATM transaction data may be aggregated to determine a time interval between first and second ATM transactions for a payment device at first and second ATM locations (determined by location services, an ATM identifier look-up, etc.). A predetermined threshold travel time, as a lower bound, may be generated at least partly by a machine learning model (e.g., in conjunction with a mapping program, which may include data of current traffic for various modes of transportation). In step 410h, a transaction service provider system may determine that the time interval between the first and second ATM transactions satisfies (e.g., equals, exceeds, etc.) a predetermined threshold travel time. If the threshold travel time is satisfied, a fraud prevention operation may be activated by a transaction service provider system in step 314. For example, a present ATM transaction may be received. A time interval between the present ATM transaction at the present location and a prior ATM transaction at a prior location may be 5 minutes. A machine learning model may have generated a predetermined threshold travel time between the present and prior locations, representative of a lower bound (e.g., a threshold of unlikely or impossible travel time), to be 5 minutes. The present ATM transaction may satisfy the threshold and, therefore, trigger the activation of a fraud prevention operation, such as declining the immediate ATM withdrawal request, disabling the payment device or an associated transaction account, and/or the like.

With further reference to FIGS. 6 and 7, and in further non-limiting embodiments or aspects, predetermined ATM activity thresholds may be set specific to a payment device, to a set of payment devices belonging to an issuer, to an ATM, to a region of ATMs, to a series of ATMs belonging to an acquirer, and/or the like.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for real-time automated teller machine (ATM) fraud detection and prevention, the method comprising:
generating, with at least one processor, at least one predetermined ATM activity threshold at least partly by a machine learning model trained on historic transaction data for a plurality of payment devices;
receiving, with at least one processor, transaction data of a plurality of transactions completed by at least one ATM, the transaction data received in real-time during transaction processing at a transaction service provider system;
storing, with at least one processor, the transaction data in a distributed cache for aggregation and recall of the transaction data;
receiving, with at least one processor, a transaction request for a user transaction at a first ATM of the at least one ATM using a payment device, the transaction request comprising a payment device identifier;
in response to receiving the transaction request, and before completion of the user transaction at the first ATM:
modifying, with at least one processor, a profile of ATM activity stored in the distributed cache and associated with the payment device identifier, the profile comprising metrics comprising at least ATM transaction value data and ATM transaction count data, wherein modifying the profile of ATM activity comprises aggregating at least one of the metrics of the profile based on the user transaction;
comparing, with at least one processor, at least one metric of the profile of ATM activity to the at least one predetermined ATM activity threshold; and
in response to determining that the at least one metric satisfies the at least one predetermined ATM activity threshold, activating, or causing the activation of, with at least one processor, a fraud prevention operation before the user transaction is completed at the first ATM, the fraud prevention operation comprising at least one of the following: declining the user transaction, disabling a transaction account associated with the payment device identifier, communicating an alert to an issuer, or any combination thereof;
retraining, with at least one processor, the machine learning model based at least partly on the transaction data received in real-time during processing of the transaction data, to produce an updated machine learning model;
regenerating, with at least one processor, the at least one predetermined ATM activity threshold at least partly by the updated machine learning model, to produce at least one updated predetermined ATM activity threshold;
receiving, with at least one processor, a new transaction request for a new user transaction at a second ATM of the at least one ATM;
comparing, with at least one processor, at least one metric of the profile of ATM activity to the at least one updated predetermined ATM activity threshold; and
in response to determining that the at least one metric satisfies the at least one updated predetermined ATM activity threshold, activating, or causing the activation of, with at least one processor, a second fraud prevention operation for the new user transaction.

2. The computer-implemented method of claim 1, wherein the first ATM is communicatively connected to the distributed cache and programmed and/or configured to aggregate the transaction data with data from the user transaction during processing of the user transaction.

3. The computer-implemented method of claim 2, wherein (i) comparing the at least one metric to the at least one predetermined ATM activity threshold and (ii) activating, or causing the activation of, the fraud prevention operation, are executed by the first ATM in real-time with processing the user transaction.

4. The computer-implemented method of claim 1, wherein the machine learning model is regularly updated based on the transaction data received in real-time during processing of the transaction data, and wherein the at least one predetermined ATM activity threshold is regenerated at regular intervals at least partly by the machine learning model.

5. The computer-implemented method of claim 1, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

6. The computer-implemented method of claim 1, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

7. The computer-implemented method of claim 1, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

8. A system for real-time automated teller machine (ATM) fraud detection and prevention, the system comprising:
   a distributed cache; and
   a server including at least one processor for executing program instructions, the server being programmed and/or configured to:
      generate at least one predetermined ATM activity threshold at least partly by a machine learning model trained on historic transaction data for a plurality of payment devices;
      receive transaction data of a plurality of transactions completed by at least one ATM, the transaction data received in real-time during transaction processing at a transaction service provider system;
      store the transaction data in the distributed cache for aggregation and recall of the transaction data;
      receive a transaction request for a user transaction at a first ATM of the at least one ATM using a payment device, the transaction request comprising a payment device identifier;
      in response to receiving the transaction request, and before completion of the user transaction at the first ATM:
         modify a profile of ATM activity stored in the distributed cache and associated with the payment device identifier, the profile comprising metrics comprising at least ATM transaction value data and ATM transaction count data, wherein, when modifying the profile of ATM activity, the server is programmed and/or configured to aggregate at least one of the metrics of the profile based on the user transaction;
         compare at least one metric of the profile of ATM activity to the at least one predetermined ATM activity threshold; and
         in response to determining that the at least one metric satisfies the at least one predetermined ATM activity threshold, activate, or cause the activation of, a fraud prevention operation before the user transaction is completed at the first ATM, the fraud prevention operation comprising at least one of the following: declining the user transaction, disabling a transaction account associated with the payment device identifier, communicating an alert to an issuer, or any combination thereof;
      retrain the machine learning model based at least partly on the transaction data received in real-time during processing of the transaction data, to produce an updated machine learning model;
      regenerate the at least one predetermined ATM activity threshold at least partly by the updated machine learning model, to produce at least one updated predetermined ATM activity threshold;
      receive a new transaction request for a new user transaction at a second ATM of the at least one ATM;
      compare at least one metric of the profile of ATM activity to the at least one updated predetermined ATM activity threshold; and
      in response to determining that the at least one metric satisfies the at least one updated predetermined ATM activity threshold, activate, or cause the activation of, a second fraud prevention operation for the new user transaction.

9. The system of claim 8, wherein the machine learning model is regularly updated based on the transaction data received in real-time during processing of the transaction data, and wherein the at least one predetermined ATM activity threshold is regenerated at regular intervals at least partly by the machine learning model.

10. The system of claim 8, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

11. The system of claim 8, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

12. The system of claim 8, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

13. A computer program product for real-time automated teller machine (ATM) fraud detection and prevention, the computer program product comprising at least one non-transitory computer-readable medium including program instructions that, when executed by at least one processor, cause the at least one processor to:
generate at least one predetermined ATM activity threshold at least partly by a machine learning model trained on historic transaction data for a plurality of payment devices;
receive transaction data of a plurality of transactions completed by at least one ATM, the transaction data received in real-time during transaction processing at a transaction service provider system;
store the transaction data in a distributed cache for aggregation and recall of the transaction data;
receive a transaction request for a user transaction at a first ATM of the at least one ATM using a payment device, the transaction request comprising a payment device identifier;
in response to receiving the transaction request, and before completion of the user transaction at the first ATM:
modify a profile of ATM activity stored in the distributed cache and associated with the payment device identifier, the profile comprising metrics comprising at least ATM transaction value data and ATM transaction count data, wherein the program instructions that cause the at least one processor to modify the profile of ATM activity cause the at least one processor to aggregate at least one of the metrics of the profile based on the user transaction;
compare at least one metric of the profile of ATM activity to at least one predetermined ATM activity threshold; and
in response to determining that the at least one metric satisfies the at least one predetermined ATM activity threshold, activate, or cause the activation of, a fraud prevention operation before the user transaction is completed at the first ATM, the fraud prevention operation comprising at least one of the following: declining the user transaction, disabling a transaction account associated with the payment device identifier, communicating an alert to an issuer, or any combination thereof;
retrain the machine learning model based at least partly on the transaction data received in real-time during processing of the transaction data, to produce an updated machine learning model;
regenerate the at least one predetermined ATM activity threshold at least partly by the updated machine learning model, to produce at least one updated predetermined ATM activity threshold;
receive a new transaction request for a new user transaction at a second ATM of the at least one ATM;
compare at least one metric of the profile of ATM activity to the at least one updated predetermined ATM activity threshold; and
in response to determining that the at least one metric satisfies the at least one updated predetermined ATM activity threshold, activate, or cause the activation of, a second fraud prevention operation for the new user transaction.

14. The computer program product of claim 13, wherein the machine learning model is regularly updated based on the transaction data received in real-time during processing of the transaction data, and wherein the at least one predetermined ATM activity threshold is regenerated at regular intervals at least partly by the machine learning model.

15. The computer program product of claim 13, wherein the at least one metric further comprises ATM transaction time data, and wherein the fraud prevention operation is activated in response to determining a count of ATM transactions associated with the payment device identifier in a time period satisfies the at least one predetermined ATM activity threshold comprising an upper threshold count of transactions.

16. The computer program product of claim 13, wherein the at least one metric further comprises ATM transaction location data, and wherein the fraud prevention operation is activated in response to determining a count of ATM transactions associated with the payment device identifier in a geographic region satisfies the at least one predetermined ATM activity threshold comprising an upper threshold count of transactions in the geographic region.

17. The computer program product of claim 13, wherein the at least one metric further comprises ATM transaction time data and ATM transaction location data, and wherein the fraud prevention operation is activated in response to determining a time interval between a first ATM transaction of the payment device and a second ATM transaction of the payment device satisfies the at least one predetermined ATM activity threshold comprising a lower threshold time interval, the lower threshold representative of an unlikely or impossible travel time between a location of the first ATM transaction and a location of the second ATM transaction.

* * * * *